United States Patent [19]
Neidigh

[11] 3,989,417
[45] Nov. 2, 1976

[54] APPARATUS FOR CONVERTING SOLAR ENERGY INTO MECHANICAL ENERGY

[75] Inventor: Robert Neidigh, Bremen, Ind.

[73] Assignee: Wheelabrator-Frye, Inc., Mishawaka, Ind.

[22] Filed: Sept. 15, 1975

[21] Appl. No.: 613,253

[52] U.S. Cl. ............................... 417/379; 417/321; 60/527; 60/641
[51] Int. Cl.² ..................... F04B 17/00; F03G 7/02; F03G 7/06
[58] Field of Search ............... 417/53, 321, 379; 60/525, 527, 641

[56] References Cited
UNITED STATES PATENTS

| 408,929 | 8/1889 | Reynolds | 417/379 X |
|---|---|---|---|
| 776,106 | 11/1904 | Beurrier | 417/379 X |
| 2,461,032 | 2/1949 | Bush | 417/379 X |
| 2,688,923 | 9/1954 | Bonaventura et al. | 417/379 |
| 3,152,442 | 10/1964 | Rowekamp | 60/641 |
| 3,259,070 | 7/1966 | McKenzie | 417/379 |
| 3,765,799 | 10/1973 | Ledner | 417/53 |
| 3,790,305 | 2/1974 | Ledner | 417/379 X |
| 3,937,599 | 2/1976 | Thureau et al. | 417/379 X |

FOREIGN PATENTS OR APPLICATIONS

| 137,424 | 12/1902 | Germany | 60/641 |
|---|---|---|---|
| 338,977 | 3/1936 | Italy | 60/641 |

*Primary Examiner*—C. J. Husar
*Assistant Examiner*—Leonard Smith
*Attorney, Agent, or Firm*—McDougall, Hersh & Scott

[57] ABSTRACT

An apparatus for producing mechanical energy utilizing the sun's rays is disclosed. The apparatus includes a continuously rotating structure having a plurality of thermally actuated pump units, consisting of a temperature sensitive cell and a piston assembly, mounted thereon. A focusing means concentrates solar rays on a number of the cells causing the expansion of material contained in each cell, resulting in the extension of a piston rod, the compression of a cylinder within the piston assembly and the transfer of fluid contained therein to a high pressure accumulator for operating hydraulic motors or the like. When rotated from under the focusing means, the cell cools resulting in a decrease in volume of the expansible material and a retraction of the piston rod causing fluid to enter the piston assembly from a reservoir. The pump unit is thus prepared for another cycle of operation beginning when the rotatable structure has completed a full revolution and the cell is again exposed to the focused rays of the sun.

15 Claims, 8 Drawing Figures

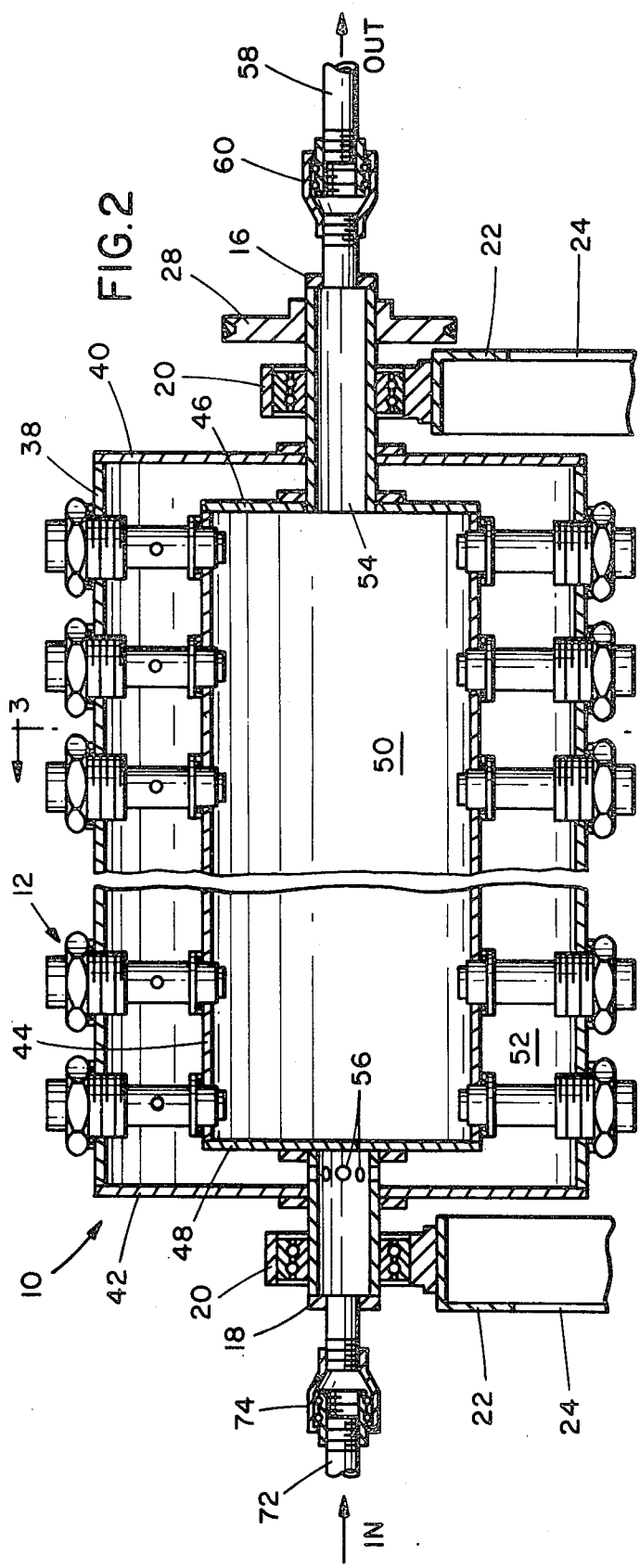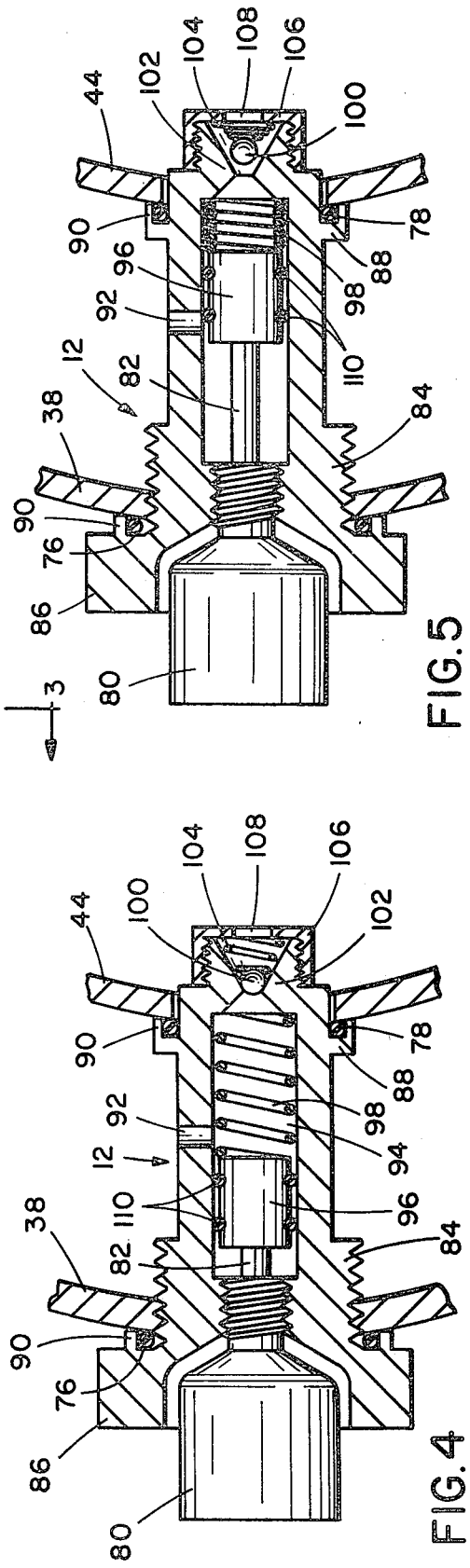

APPARATUS FOR CONVERTING SOLAR ENERGY INTO MECHANICAL ENERGY

BACKGROUND OF THE INVENTION

This invention relates to a means of converting solar energy to mechanical energy. More particularly, it relates to a device which utilizes the rays of the sun to pump fluid into a high pressure accumulator. Such pressurized fluid is useful in performing such mechanical functions as operating hydraulic motors.

In U.S. Pat. No. 3,259,070, description is made of a pump which comprises a thermal-activated piston assembly and a positive displacement fluid chamber. In this device, a thermal motor containing a wax pellet is electrically heated, causing the wax to increase in volume, resulting in the extension of the shaft of the motor. The extended motor shaft actuates the aforementioned piston assembly, resulting in the increase in pressure of the fluid within the fluid chamber. At a predetermined pressure, a valve in the fluid chamber opens permitting the fluid to rapidly discharge into an associated metering system. The supply of electricity to the thermal motor is then cut off by means of a switching device, resulting in the cooling and subsequent shrinking of the wax pellet, allowing the piston assembly and the thermal motor shaft to be retracted via a series of springs. While retracting, the piston chamber is refilled with fluid and the switching device is reset, enabling the electrical energy to be resumed at any time thereafter, starting another cycle of operation.

The device in the above referenced patent is rather complicated in construction, relying on a number of springs to return the piston and thermal motor shaft to be retracted position at the completion of the pumping operation. Another disadvantage of this design is its continued dependence on electrical energy to actuate the thermal motor.

A pumping device, which is not dependent on electrical energy, is disclosed in U.S. Pat. No. 2,688,922 to Bonaventura et al. In this patent, description is made of a hyperbolic reflector, concentrating the sun's rays on one of a plurality of boilers containing liquid. The boiler in the focus of the reflector increases in temperature and pressure causing the contents to be expelled through a check value into an outlet manifold. The resulting decrease in weight causes the empty boiler to be rotated out of the heating zone, being replaced by a heavier, liquid-filled boiler. Being removed from the focused rays of the sun, the empty boiler cools, resulting in the creation of a partial vacuum within. The vacuum draws liquid into the boiler from an inlet manifold through a check valve, preparing the boiler for subsequent heating.

This device is inefficient since a considerable amount of time is required to bring the liquid within the boilers to a point where the boiler's internal pressure is greater than the pressure in the outlet manifold, causing liquid to be evacuated therefrom. A considerable time is likewise required to cool the boiler down to a point where the vacuum created is able to draw liquid from the inlet manifold. This device is also inefficient in that any malfunctions within the boiler would result in considerable down-time while repairs are being made.

Accordingly, it is an object of the present invention to provide a means of producing mechanical energy using solar rays, relying on an external power source only during the initial minutes of operation.

It is another object of this invention to provide a means of producing mechanical energy which operates continuously.

It is further object of the present invention to provide a means of producing mechanical energy which is relatively simple in both construction and operation.

It is still a further object of the present invention to provide a means of producing mechanical energy which has a minimum response time.

It is yet a further object of the present invention to provide a means of producing mechanical energy in which damaged parts can be replaced easily, thus minimizing down-time.

Other objects and advantages of the invention will be apparent from the concluding portion of the specification.

BRIEF DESCRIPTION OF THE DRAWINGS

FIG. 2 is a sectional view through the device illustrating the details thereof taken along the lines 2—2 of FIG. 1;

FIG. 4 is a side view of a pump unit having portions cut away illustrating the piston rod in the fully retracted position;

FIG. 5 is a side view similar to FIG. 4 illustrating the piston rod in the fully extended position;

DETAILED DESCRIPTION

Figure 1:
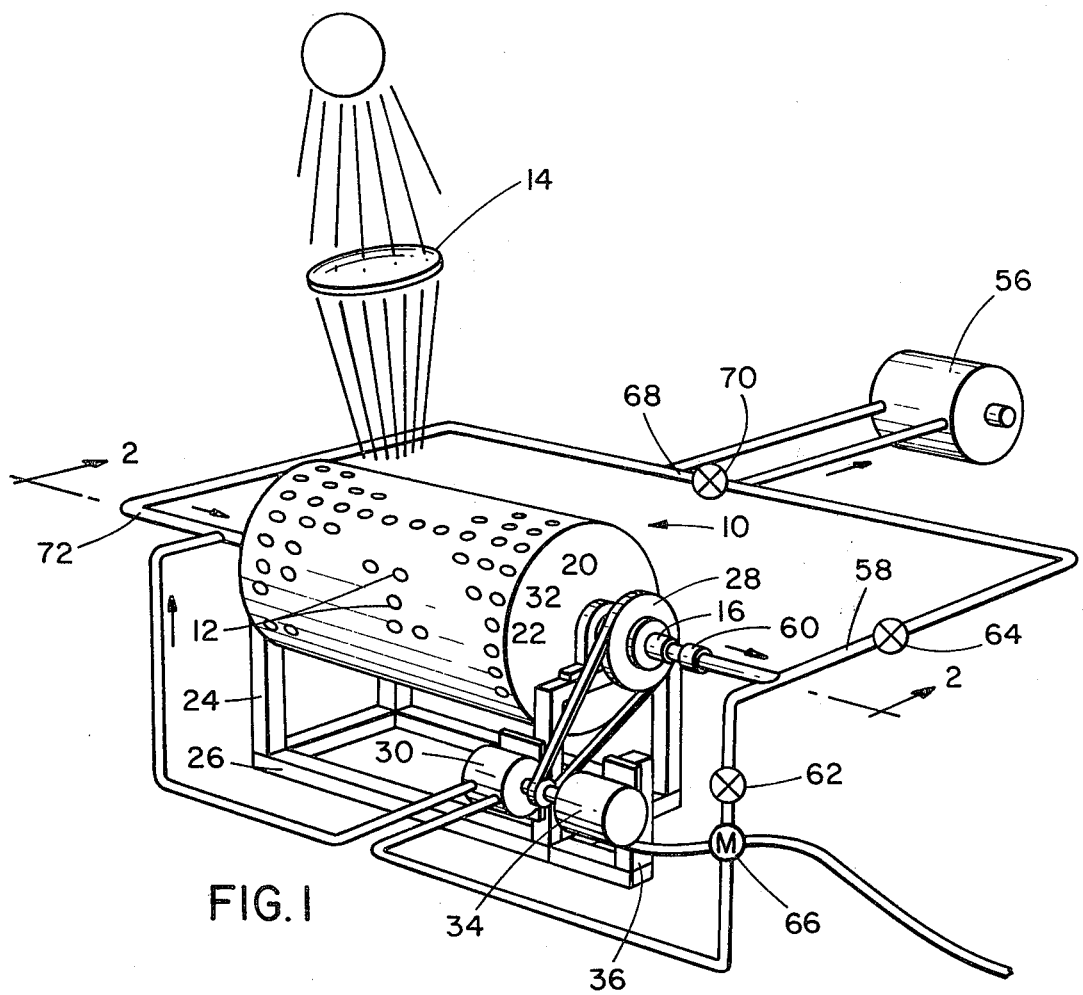
FIG. 1 is a perspective view of the device according to the present invention.

Referring to FIGS. 1 and 2, a device according to a preferred embodiment of the invention is shown. Cylindrical drum 10 has a plurality of thermally actuated pump units 12 mounted on its periphery. The rays of the sun are concentrated on a number of these pump units by means of one or more lenses 14, held in position by either an independent frame or by a member attached to the supporting structure of drum 10 to be hereafter described. For clarity, details of the lense mounting means have been omitted since they form no part of the present invention.

Tubular shafts 16 and 18, extending from drum 10 along its longitudinal axis, are journaled in bearings 20 mounted on upper supported 22 which are connected by vertical legs 24 to a base 26. Sheave 28 is fixed on shaft 16, enabling the drum to be rotated on its longitudinal axis at a constant angular velocity by means of a hydraulic motor 30 and drive belt 32. The drive shaft of motor 30 is connected by means of a suitable coupling (not shown) to an auxiliary electric motor 34, mounted to a vertical member 36, connected to an extension of base 26; which enables the drum to be rotated during the initial minutes of operation as will be hereafter described.

Drum 10, shown in greater detail in FIG. 2, consists of two co-axial cylinders; an outer cylinder formed by a wall 38 and horizontally opposed end members 40 and 42, and an inner cylinder having a wall 44 and end members 46 and 48 being of smaller radial dimension than the end members 40 and 42. A cylindrical accumulator 50 for pressurized fluid is thus formed within the inner cylinder and an annular reservoir 52 for unpressurized fluid is formed between the inner and outer cylinders.

Shaft 16 extends through and is integral with end 40 of the outer cylinder and is fixed to end 46 of the inner cylinder, communicating with the interior of accumulator 50 through an opening 54 in end 46. Similarly shaft 18 extends through and is integral with end 42 of the outer cylindr and is fixed to the outer surface of end 48 to the inner cylinder, communicating with the interior of annular reservoir 52 by means of outlet holes 56 arranged on its periphery. Thus, shafts 16 and 18 not only serve to maintain the relative positions of the inner and outer cylinders but, also as a means to transport fluid to and from drum 10.

As will be described, pressurized fluid from acculator 50 is transferred through tubular shaft 16 to motor 30 and device 56, which can be any type of hydraulic device such as a hydraulic motor or hydraulic cylinder, by inlet lines 58. Shaft 16 is attached to the inlet lines by any type of commercially available hydraulic connector 60.

The inlet lines 58 are provided with pressure actuated valves 62 and 64 which enable the operation of the motor 30 or the device 56 to be started or stopped manually at any time, provided the pressure in accumulator 50 is within a predetermined operating range. If the pressure in the accumulator is below a minimum value, as for instance during the first minutes of operation, the valves 62 and 64 will not allow fluid to flow to the motor or the device.

The inlet line to motor 30 has a metering device 66 associated with valve 62 such that, if the pressure in the accumulator 50 is below the minimum value necessary to sustain the operation of the motor, the absence of fluid flow through the metering device will cause electric motor 34 to become operational. If, for some reason during operation, the pressure in the accumulator drops below the minimum value necessary to continue the operation of motor 30, valve 62 will close and the resulting interruption of flow through the metering device will cause motor 30 to stop and electric motor 34 to be actuated, maintaining the rotation of drum 10 until the pressure in the accumulator is again within the operating limits of the hydraulic motor.

If the device 56 is not operated for a period of time, the pressure in the accumulator 50 will increase as long as drum 10 continues to rotate. To prevent possible damage to the pump units 12 caused by excessively high pressures, relief line 68 is connected to the inlet and outlet lines of device 56. The relief line is also provided with a pressure actuated valve 70, similar to valves 62 and 64, such that excessive pressure in the accumulator will cause valve 70 to open, permitting fluid to pass through the relief line, by-passing device 56, thus preventing the pressure within the accumulator from increasing beyond a maximum value.

Low pressure fluid leaving motor 30 and device 56 is returned to resevoir 52 for reuse through the outlet lines 72, connected to hydraulic connector 74 which is threadably secured to one end of tubular shaft 18. Hydraulic connectors 60 and 74 are constructed so as to permit drum 10, shafts 16 and 18 and hydraulic connectors 60 and 74 to be rotated as a unit, at the same time maintaining sealing engagement with inlet lines 58 and outlet lines 72 which remain stationary.

Figure 3:
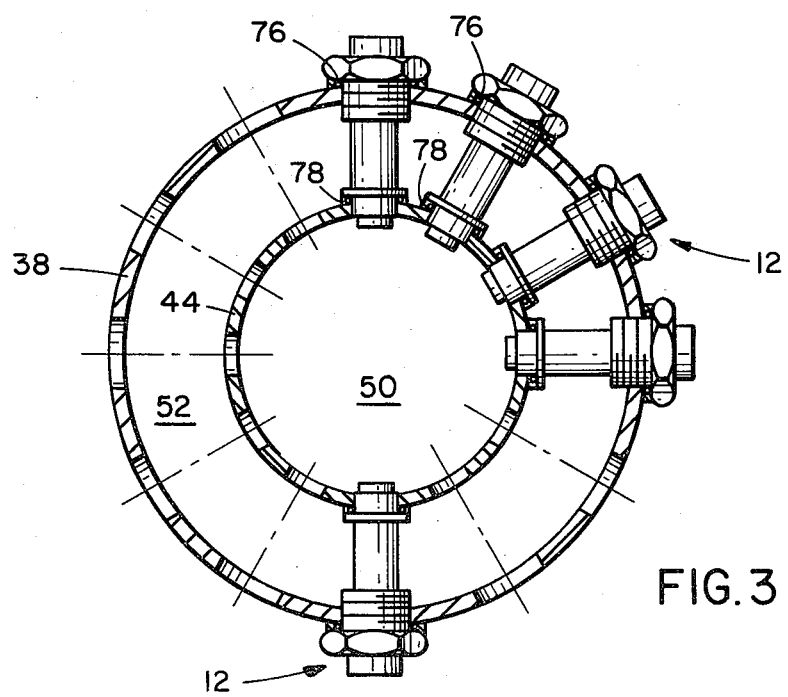
FIG. 3 is a sectional view through the device taken along the lines 3—3 of FIG. 2.

As shown in FIG. 3, pump units 12 pass through annular resevoir 52 and extend into accumulator 50. The pump units are threadably secured to wall 38 of the outer cylinder, having suitable sealing means such as O-rings 76 to prevent fluid from leaking from the annular reservoir. In a like manner, the end of the pump units extending into the accumulator, have sealing means such as O-rings 78 preventing pressurized fluid from leaking from the accumulator to the annular resevoir.

Referring now to FIGS. 4 and 5, pump unit 12 is shown in greater detail. The upper section of the pump unit is any type of diaphragm plug-type thermal cell 80 such as those manufactured by the Eaton Corporation Controls Division of Carol Stream, Illinois. Construction of the thermal cell is not shown in detail since it forms no part of the present invention. It is sufficient to say that a wax pellet, contained within the housing of the cell, expands due to increased temperature, causing the extension of a piston rod 82. The lower section of pump unit 12 consists of a piston assembly 84 which threadably receives thermal cell 80. The piston assembly has a radially extending portion 86 at the end protruding from drum 10, and another radially extending portion 88 part way up from the opposite end. Retention members 90, extending from radial extensions 86 and 88, maintain sealing means 76 and 78 in proper position.

Inlet port 92 communicates annular resevoir 52 with cylinder 94 within piston assembly 84. Piston Head 96 is slidably contained within the cylinder and maintained in contact with piston rod 82 by means of spring 98. The piston assembly is preferably made from a material which exhibits a high resistance to scratching, such as silicon carbide, to prevent the spring from wearing the surface of the cylinder. The end of piston assembly 84, opposite the thermal cell, has a check valve 100 sealed against valve seat 102 by means of spring 104 held in position by retainer cap 106 threadably secured to the end of the piston assembly. Retainer cap 106 extends into and communicates with accumulator 50 by means of outlet port 108. As fluid is compressed in the cylinder 94 by piston head 96, it is prevented from leaking around the piston head by sealing means such as O-rings 110. It will be understood that the piston head could alternatively be a lap fit within the cylinder, eliminating the need for O-rings.

Initially the fluid in the annular reservoir 52 and the accumulator 50 is at ambient pressure and each pump unit 12 is in fully retracted position, as shown in FIG. 4, allowing fluid from the annular reservoir to pass through inlet port 92 into cylinder 94. The pressure of the fluid in the accumulator at this time is not sufficient to open valve 62 and the absence of flow through metering device 66 results in the electric motor 34 being activated, causing drum 10 to rotate. The rays of the sun, passing through lens 14, are focused on a number of pump units, causing the temperature of thermal cell 80 to increase, resulting in the expansion of the material contained therein, the extension of the piston rod 82 and the compression of cylinder 94 by the cylinder head 96. As the cylinder is compressed, inlet port 92 is sealed off by the piston head and the pressure of fluid within the cylinder in increased. When piston rod 82 nears the fully extended position shown in FIG. 5, the pressure of fluid within the cylinder exceeds the combined forces of the spring 104 and the pressure of fluid in accumulator 50 acting to maintain check valve 100 in sealing engagement with valve seat 102, at which time the check valve is unseated, allowing fluid from the cylinder to pass into the accumulator.

As drum 10 continues to rotate, pump unit 12 is moved from under lens 14 and the material inside the cell 80 cools, thereby decreasing in volume, causing the piston head 96 and piston rod 82 to return to the retracted position by means of spring 98.

As the piston head 96 begins to retract, the increase in volume of cylinder 94 causes a corresponding decrease in the pressure on check valve 100, resulting in the check valve being reseated against valve seat 102 by the combined forces of the spring 104 and the pressurized fluid within the accumulator 50. When piston rod 82 approaches the fully retracted position, inlet port 92 is again uncovered, allowing fluid from annular resevoir 52 to enter the cylinder.

Pump units 12 continue to rotate through the concentrated rays of the sun at a constant rate, causing the pressure in accumulator 50 to increase. When the pressure in the accumulator is within the operating range of motor 30, valve 62 opens permitting fluid to pass through metering device 66, breaking the connection between the external power source and the electric motor 34 and allowing the hydraulic motor to maintain the rotation of drum 10. The rotation of the drum is continued and the pressure in accumulator 50 continues to increase until valve 64 opens, beginning the operation of device 56. De-pressurized fluid from motor 30 and device 56 is returned to annular resevoir 52, as described previously, completing a complete cycle of operation.

Figure 6:
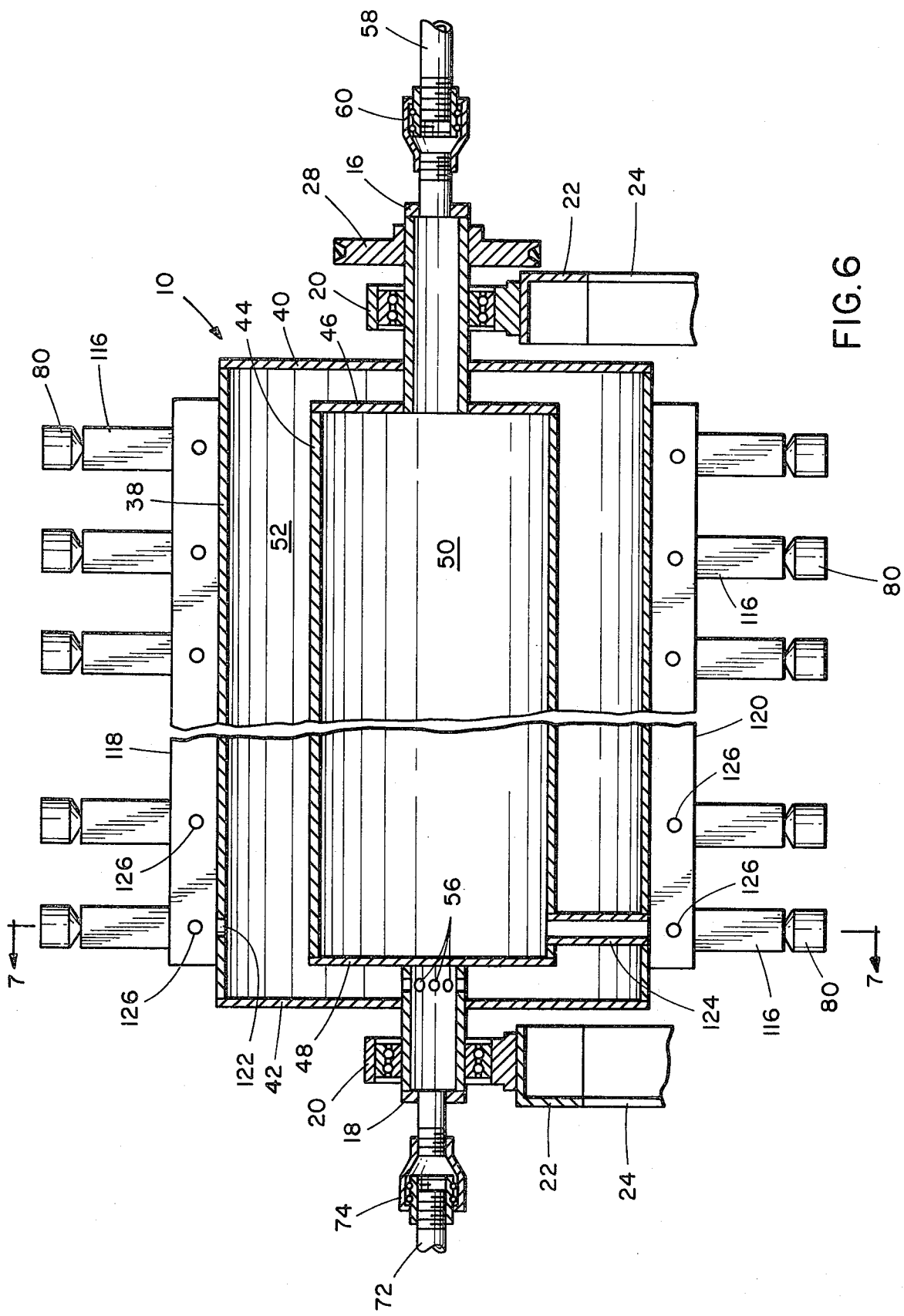
FIG. 6 is a view similar to FIG. 2 according to a second embodiment of the invention.
Figure 7:
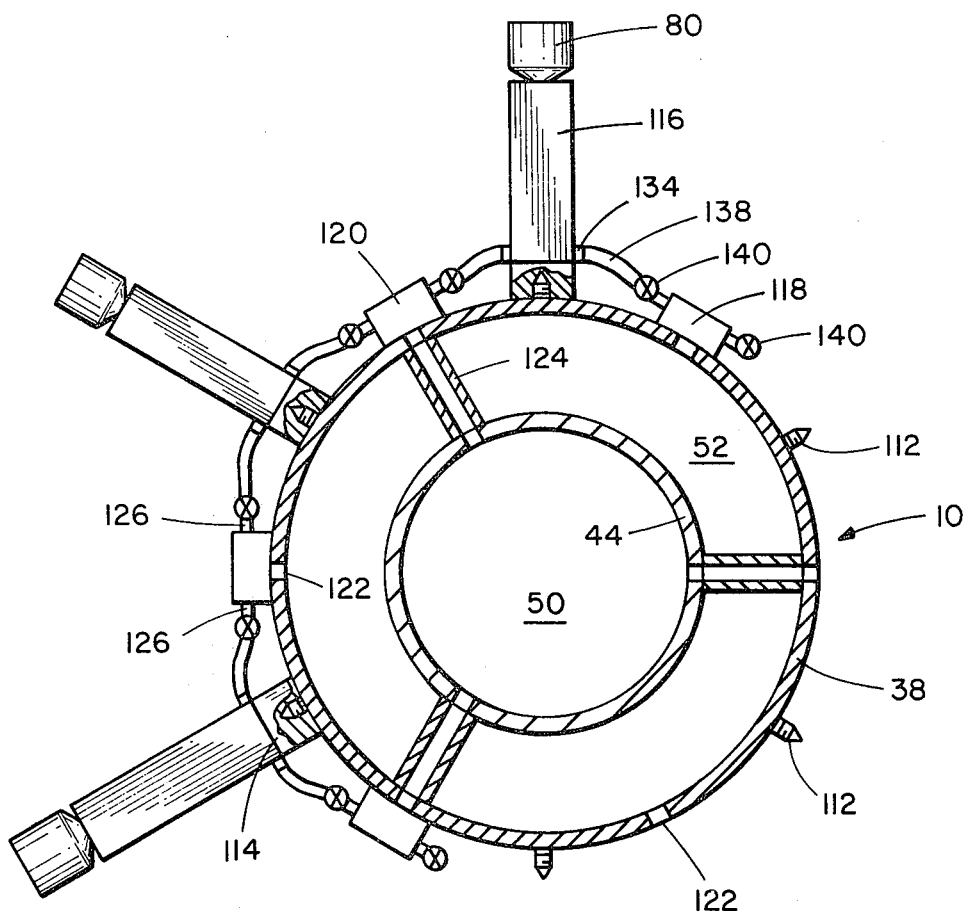
FIG. 7 is a sectional view through the device taken along lines 7—7 of FIG. 6.
Figure 8:
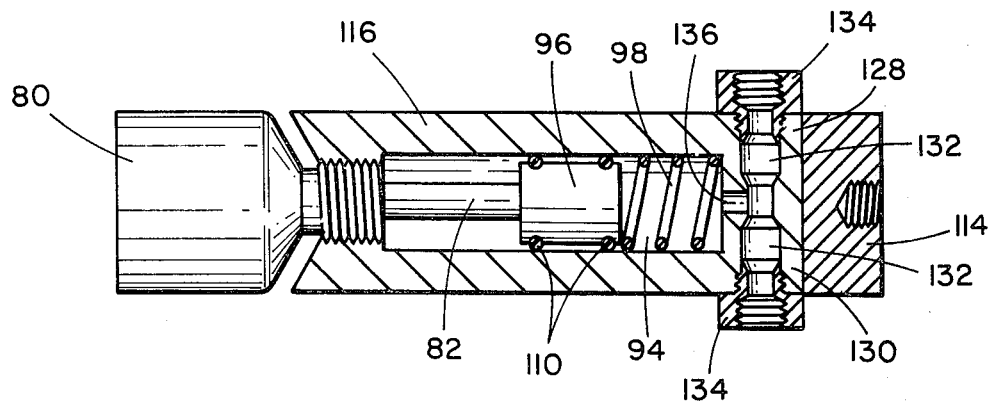
FIG. 8 is a side view of a pump unit having portions cut away illustrating the details thereof.

Referring now to FIGS. 6 – 8, a device according to a second embodiment of the invention is illustrated. For simplicity, those elements common to the first embodiment have been given the same reference numerals in the figures. The second embodiment is characterized by the thermally actuated pump units being mounted on the surface of the rotating drum and communicating with the annular resevoir and the high pressure accumulator by means of inlet and outlet manifolds. For this purpose, drum 10 is provided with a plurality of mounting studs 112 extending radially therefrom and threadably received in base 114 of the piston assemblies 116. Inlet and outlet manifolds 118 and 120 are integrally mounted to the outer surface of the drum. As shown in FIG. 6, inlet manifolds 118 communicate with the annular resevoir 52 by means of an opening 122 in wall 38 of the drum. Outlet manifolds 120 communicate with accumulator 50 by means of a tube 124, passing through the resevoir and formed integrally with wall 38 of the outer cylinder and wall 44 of the inner cylinder of drum 10. The inlet and outlet manifolds are provided with threadably secured extensions 126 for each pump unit mounted therebetween.

As shown in FIG. 8, inlet port 128 and outlet port 130 of piston assembly 116 are provided with suitable one-way valves 132 well known in the art. Valves of this type, such as those manufactured by the Kepner Products Company of Summit, Illinois, allow fluid to flow only in one direction, therefor prohibiting pressurized fluid from cylinder 94 from entering the inlet manifold 118 and, similarly, preventing pressurized fluid from the outlet manifold 120 from entering the cylinder. The valves 132 are maintained in position by extensions 134, threadably secured within the inlet and outlet ports 128 and 130. Details of the construction of the valves have been omitted since they form no part of the present invention.

As piston rod 82 extends due to the increase in temperature of thermal cell 80, the piston head 96 begins to compress the fluid in cylinder 94. Compression continues until the pressure in the cylinder is greater than the pressure of the fluid in the outlet manifold 120, at which time fluid passes through opening 136 in the end of cylinder 94, through valve 132 in outlet port 130 and out of the piston assembly.

As in the first embodiment, cooling of cell 80 results in piston rod 82 and piston head 96 being returned to the retracted position by spring 98, resulting in a decrease in cylinder pressure, causing fluid to enter the cylinder from inlet manifold 118 through valve 132 in inlet port 128.

Standard hydraulic lines 138 have one end threadably secured to extensions 134 of the inlet and outlet ports 128 and 130 and the other end threadably secured to valves 140 which are threadably attached to the extensions 126 of the inlet and outlet manifolds 118 and 120. Valves 140 enable the flow of fluid from the inlet and outlet manifolds to be interrupted if it becomes necessary to replace a malfunctioning pump unit at any time during operation.

It will be understood that in this embodiment of the invention, the fact that the pump units communicate with the reservoir and the high pressure accumulator by means of manifolds and hydraulic lines, enables the function of the cylindrical and annular chambers to be reversed. That is, the cylindrical chamber could act as the reservoir while the annular chamber functions as the accumulator for high pressure fluid.

While I have shown and described embodiments of this invention in some detail, it will be understood that this description and illustrations are offered merely by way of example and that the invention is to be limited in scope only by the appended claims.

I claim:
1. A solar powered device for pressurizing fluid from a reservoir into an accumulator for operating hydraulic devices comprising:
  a. a base;
  b. a drum, having a reservoir and an accumulator disposed therein, rotatably supported on said base;
  c. a plurality of solar actuated pump units disposed on said drum and communicating with said reservoir and said accumulator for pressurizing fluid from said reservoir into said accumulator responsive to solar energy impinging on said units; and
  d. means for rotating said drum to repetitively cycle said pump units.

2. The device according to claim 1 wherein said pump unit includes:
  a. a temperature sensitive cell expanding and contracting in response to temperature increases and decreases, respectively; and
  b. a piston assembly mounted adjacent said cell actuated by the expansion and contraction of said cell.

3. The device according to claim 1 wherein said means for rotating said drum is a hydraulic motor.

4. The device according to claim 1 wherein said drum comprises a pair of horizontally disposed concentric cylinders closed at their ends to define a cylindrical chamber within the inner cylinder and an annular chamber between the inner and outer cylinders, said cylindrical chamber constituting said accumulator and said annular chamber constituting said reservoir.

5. The device according to claim 4 further including a tubular shaft, extending from one end of said drum communicating with said cylindrical chamber, transporting fluid under pressure from said cylindrical chamber to a hydraulic device and another tubular shaft, extending from the opposite end of said drum communicating with said annular chamber, transporting fluid to said annular chamber for reuse.

6. The device according to claim 4 wherein said pump units are secured to said outer cylinder, passing through said annular chamber and extending into said cylindrical chamber.

7. A solar powered device for pressurizing fluid from a reservoir into an accumulator for operating hydraulic devices comprising:
 a. a base;
 b. a drum, having a reservoir and an accumulator disposed therein, rotatably supported on said base;
 c. a plurality of solar actuated pump units disposed on said drum for pressurizing fluid from said reservoir into said accumulator responsive to solar energy impinging on said units;
 d. at least one first manifold fixed to said drum for transporting fluid from said reservoir to said pump units;
 e. at least one second manifold fixed to said drum for transporting fluid from said pump units to said accumulator; and
 f. means for rotating said drum to repetitively cycle said pump units.

8. The device according to claim 7 wherein said drum includes threadable extensions extending radially outward from the surface of said drum for mounting said pump units.

9. The device according to claim 7 wherein said first and second manifolds include valves secured between said manifolds and said pump units.

10. The device according to claim 7 wherein said means for rotating said drum is a hydraulic motor.

11. The device according to claim 7 wherein said pump unit includes:
 a. a temperature sensitive cell expanding and contracting in response to temperature increases and decreases, respectively; and
 b. a piston assembly mounted adjacent said cell actuated by the expansion and contraction of said cell.

12. The device according to claim 7 wherein said drum comprises a pair of horizontally disposed concentric cylinders, closed at their ends to define a cylindrical chamber within the inner cylinder and an annular chamber between the inner and outer cylinders, said cylindrical chamber constituting said accumulator and said annular chamber constituting said reservoir.

13. The device according to claim 12 further including a tubular shaft, extending from one end of said drum communicating with said cylindrical chamber, transporting fluid under pressure from said cylindrical chamber to a hydraulic device and another tubular shaft, extending from the opposite end of said drum communicating with said annular chamber, transporting fluid to said annular chamber for reuse.

14. The device according to claim 7 wherein said drum comprises a pair of horizontally disposed concentric cylinders, closed at their ends to define a cylindrical chamber within the inner cylinder and an annular chamber between the inner and outer cylinders, said cylindrical chamber constituting said reservoir and said annular chamber constituting said accumulator.

15. The device according to claim 14 further including a tubular shaft, extending from one end of said drum communicating with said annular chamber, transporting fluid under pressure from said annular chamber to a hydraulic device and another tubular shaft, extending from the opposite end of said drum communicating with said cylindrical chamber, transporting fluid to said cylindrical chamber for reuse.

* * * * *